United States Patent [19]

Alley et al.

[11] Patent Number: 4,564,751
[45] Date of Patent: Jan. 14, 1986

[54] WRAP-AROUND AUXILIARY KEYBOARD

[75] Inventors: Lynn D. Alley, Riverton; Stephen W. Alley, Bountiful; William K. Sadlier; Richard A. Burton, both of Salt Lake City, all of Utah

[73] Assignee: The Legacy Group Research and Development Limited Partnership, Salt Lake City, Utah

[21] Appl. No.: 716,200

[22] Filed: Mar. 26, 1985

[51] Int. Cl.⁴ .............................................. G06C 7/02
[52] U.S. Cl. .................................... 235/146; 364/708
[58] Field of Search ........................... 235/145 R–146; 364/708; 200/5 A

[56] References Cited

U.S. PATENT DOCUMENTS 3,940,758  2/1976  Margolin ..................... 364/708 X
4,490,604  12/1984  Read et al. ..................... 235/145 R Primary Examiner—Benjamin R. Fuller
Attorney, Agent, or Firm—Jon C. Christiansen

[57] ABSTRACT

A wrap-around auxiliary keyboard having (1) housing, (2) keys positioned in the housing and (3) circuitry means in the housing. The housing has a base and at least one extension extending from the base. The base and extension(s) are shaped and positioned with respect to each other so as to be able to wrap-around a primary keyboard.

21 Claims, 6 Drawing Figures

WRAP-AROUND AUXILIARY KEYBOARD

INTRODUCTION

This invention relates to keyboards used as input devices for the transfer of information and data to a computer from a source external to the computer. Keyboards are commonly used as a means for transferring information and data from a human operator to a computer. The keys of a keyboard represent various characters, including alphabetic letters, single digit numbers (0-9), punctuation marks, space character and special characters (e.g. %, @, $, #, etc.). The human operator inputs information and data into the computer by inputing such character set data into the keyboard which in turn transfers the character set data (in a suitably coded form) to the memory of the computer. Keyboard technology (including the underlying electronic circuitry) is a well established art and this disclosure is directed towards persons of ordinary skill in such art.

The character set of a keyboard is defined by and limited to the particular keys that it houses. Although additional characters can be generated through the use of combinations of keys, the number of keyboard keys remains a limiting factor. To increase the number of keys available to a human operator and/or to provide a more convenient arrangement of keys, a second keyboard (sometimes called keypad) is sometimes connected by an extended cable to the primary keyboard. The invention described and claimed herein represents a significant advance in the relevant art and provides solutions and advantages heretofore unavailable.

SUMMARY OF THE INVENTION

This invention includes auxiliary keyboards, auxiliary keyboard housings and keyboard systems. The auxiliary keyboard of this invention is used to augment or supplement the capabilities of primary keyboards. A primary keyboard can be any keyboard and is the keyboard augmented or supplemented by the auxiliary keyboard.

The auxiliary keyboard of this invention has (1) housing, (2) keys positioned in the housing and (3) circuitry means in the housing for input of character set data from said keys and for output or transfer of the character set data from the auxiliary keyboard (to a computer or other destination). The circuitry means can be conventional keyboard circuitry. This invention disclosure and the appended claims do not focus on specific circuitry as the essence of this invention does not relate thereto and persons of ordinary skill in the relevant art possess sufficient knowledge of keyboard circuitry to practice this invention when given this disclosure. The housing has a base and at least one extension extending from the base. The base and the extension are shaped and positioned with respect to each other so as to be able to wrap-around a primary keyboard. As used in this disclosure and the appended claims, an auxiliary keyboard housing (i.e. base and extension) "wraps-around" a primary keyboard when the base (or a portion of the base) interfaces with a side (or a portion of the side) of the primary keyboard and the extension (or a portion of the extension) interfaces with a different side (or a portion of a different side) of the primary keyboard.

The auxiliary keyboard housing of this invention is formed from a base and at least one extension extending from the base. The housing thus formed is shaped and adapted to accommodate keys and circuitry for the input and transfer of character set data. As discussed above, the essence of this invention does not relate to the circuitry and the housing of this invention can be used with, but is not limited to, conventional keyboard circuitry.

The keyboard system of this invention combines a wrap-around auxiliary keyboard and a primary keyboard. The keyboards are in close physical proximity to each other and the auxiliary keyboard is positioned to wrap-around the primary keyboard (i.e. the housing of the auxiliary keyboard wraps-around the primary keyboard in the manner described above).

The above-described wrap-around positioning is advantageous in many respects. The base and each extension provides support to the primary keyboard in that horizontal movement of the primary keyboard relative to the auxiliary keyboard is restrained in at least two directions. As more fully described in Section IV the wrap-around positioning allows for and facilitates various means of restraining vertical and horizontal movement of the primary board relative to the auxiliary keyboard. Wrap-around positioning also creates a more user-friendly environment, as compared to the concurrent use of two separate keyboards not utilizing wrap-around positioning, in that wrap-around positioning saves space, makes typing (i.e. data entry) easier for the operator, reduces operator fatigue, allows the operator to use two keyboards as one, and reduces cable requirements.

Although useful for many other purposes this invention can be used as part of a bridging system which allows for the use of software compatible on a first computer hardware system (e.g. "IBM PC") to be run on a second, and otherwise incompatible, computer hardware system (e.g. "Apple MacIntosh"). One of the incompatibilities which such a bridging system may have to remedy is keyboard incompatibility, i.e. the keyboard of the second hardware system (i.e. the primary keyboard) may not have all of the capabilities needed to utilize the software. Keyboard incompatibility may require a second keyboard. To eliminate the disadvantages otherwise attending concurrent use of separate keyboards, the wrap-around auxiliary keyboard of this invention can be used as the second keyboard and as part of the solution to the above-described keyboard incompatibility problem.

DETAILED DESCRIPTION OF THE INVENTION

Figure 1:
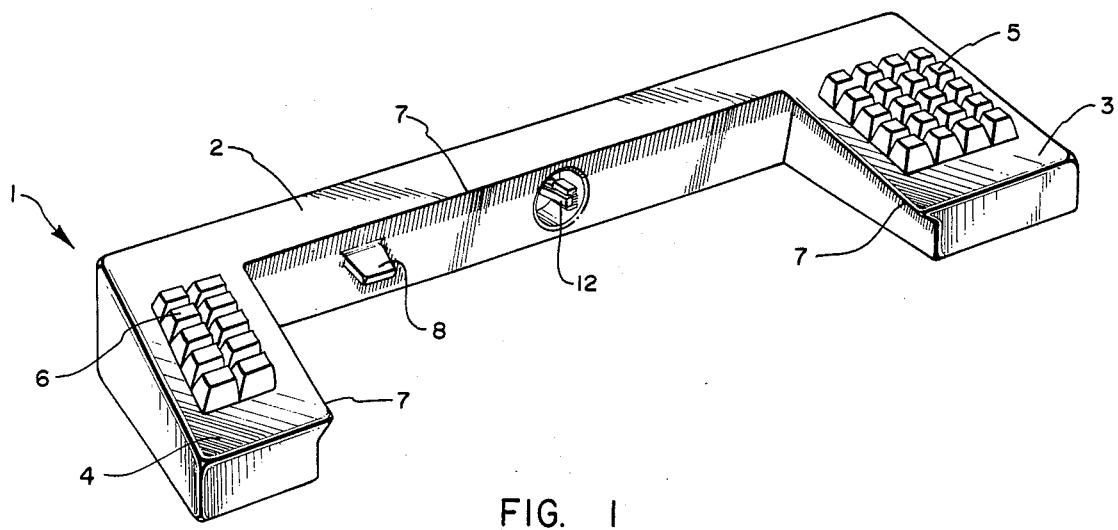
FIG. 1 depicts the preferred embodiment of the wrap-around auxiliary keyboard of this invention.
Figure 2:
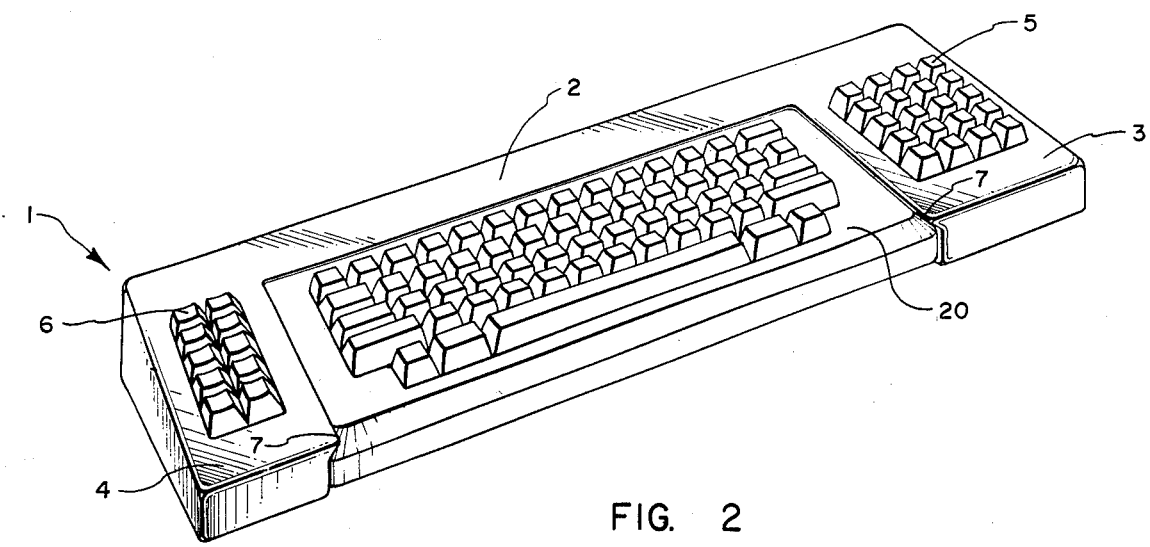
FIG. 2 depicts the wrap-around auxiliary keyboard of FIG. 1 in combination with a primary keyboard.
Figure 3:
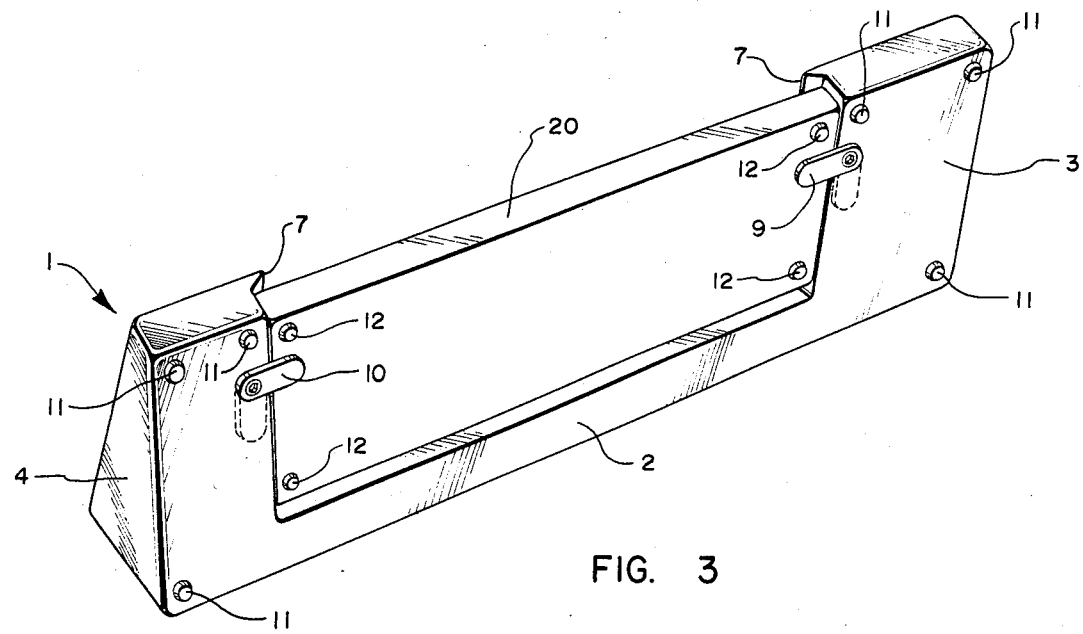
FIG. 3 depicts the undersides of the wrap-around auxiliary keyboard and primary keyboard of FIG. 2.

FIGS. 1, 2 and 3 depict a substantially U-shaped wrap-around auxiliary keyboard 1 which is the preferred embodiment of this Invention. The auxiliary keyboard has a substantially rectangular base 2, a substantially rectangular first extension 3 extending from base 2 and a substantially rectangular second extension 4 extending from base 2. As used in this disclosure and the appended claims, the base or any of the extensions is "substantially rectangular" when, viewed from directly above, it has a substantially rectangular shape. Extensions 3 and 4 are substantially perpendicular to base 2. Base 2 and extensions 3 and 4 form a substantially U-shaped keyboard housing. As used in this disclosure and the appended claims an auxiliary keyboard (and its housing) is U-shaped when the base-primary keyboard and extensions-primary keyboard interfaces substantially and collectively assume the shape of a U or three sides of a rectangle.

The housing depicted in FIG. 1 is a single unitary body but the base and extensions in an alternative embodiment (not shown) could be separate units attached or joined together to form the U-shaped housing. The housing can be made of hard plastic or any other material used for keyboard housings. Positioned in the housing are a first set of keys 5, a second set of keys 6 and circuitry (not shown) for the input of character set data from the keys and the output or transfer of character set data from the auxiliary keyboard 1. Conventional keyboard circuitry can be used for this purpose.

FIG. 2 depicts, in addition to the auxiliary keyboard 1, a substantially rectangular primary keyboard 20. As used in this disclosure and the appended claims, a primary keyboard is "substantially rectangular" when, viewed from directly above, it has a substantially rectangular shape. The auxiliary keyboard 1 is positioned such that it "wraps-around" the primary keyboard 20. The L-shaped portion of the housing formed by the base 2 and extension 3 "wraps-around" the primary keyboard 20 because the base 2 interfaces with one side (i.e. the back side) of the primary keyboard 20 and the extension 3 interfaces with another side (i.e. the right side) of the primary keyboard 20. Similarly, the L-shaped portion of the housing formed by the base 2 and extension 4 "wraps-around" the pirmary keyboard 20 because the base 2 interfaces with one side (i.e. the back side) of the primary keyboard 20 and the extension 4 interfaces with another side (i.e. the left side) of the primary keyboard 20.

A lip 7 extends from base 2 and extensions 3 and 4 (i.e. the lip 7 extends from the housing). The lip 7 is positioned above the area occupied by the primary keyboard 20. A rigid plastic tongue 8 extends from base 2. The back side of the primary keyboard 20 includes a hole or slot (not shown) sized to receive tongue 8 and to provide a friction fit. Attached to the undersides of extensions 3 and 4 (see FIG. 3) are rotatable plastic tabs 9 and 10. The tabs 9 and 10 are rotated and positioned beneath the primary keyboard 20.

The lip 7, the tongue 8 and rotatable tabs 9 and 10 are various means for restraining vertical movement (i.e. upward and/or downward movement) of the primary keyboard 20 relative to the auxiliary keyboard 1 (or its housing). The lip 7 restrains upward movement of the primary keyboard 20. The tongue 8 restrains both upward and downward movement of the primary keyboard 20. It is noted that the tongue 8 also serves to restrain horizontal movement of the primary keyboard 20 to the left and to the right. The tabs 9 and 10 restrain downward movement of the primary board 20. Other arrangements and combinations of these various restraining means are within the scope of this invention. For example, a second lip 7 positioned below the primary keyboard could be used in place of the tabs 9 and 10. The invention also includes within its scope all other possible kinds of restraining means for restraining vertical movement of the primary keyboard 2 relative to the auxiliary keyboard 1. The various kinds of other restraining means within the scope of this invention include, by way of nonlimiting example, screws, bolts, extensions, bars, adhesives and the like.

The base 2 and extensions 3 and 4, because of the wrap-around relationship to the primary keyboard 20, restrain horizontal movement of the primary keyboard 20 relative to the auxiliary keyboard 1. The base 2 restrains backwards horizontal movement of the primary keyboard 20. Extension 3 restrains horizontal movement of the primary keyboard 20 to the right. Extension 4 restrains horizontal movement of the primary keyboard 20 to the left. The restraining means (lip 7, tongue 8, and tabs 9 and 10) and the wrap-around housing (base 2 and extensions 3 and 4) combine to restrain vertical and horizontal movement of the primary keyboard 20 (relative to the auxiliary keyboard 1) in all directions except for forward horizontal movement. Forward horizontal movement is inhibited, but not prevented, by the friction fit of tongue 8 into the primary keyboard slot (not shown). Thus, the primary keyboard 20 can slide in and out of the wrap-around auxiliary keyboard 1. When the primary keyboard is in place (as shown in FIG. 2) the keyboard system (i.e. primary and auxiliary keyboards) can be utilized by the operator as if the system were a single keyboard.

Rubber feet 11 are attached to the underside of the housing (formed by base 2 and extensions 3 and 4) as shown in FIG. 3. These rubber feet 11 are similar to the rubber feet 12 attached to the underside of the primary keyboard 20. The rubber feet 11 and 12 are of the same height and allow for rotation of tabs 9 and 10.

A cable and connection means 12 serves as part of the circuitry means which allows for the transfer of character set data between the auxiliary keyboard 1 and the primary keyboard 20. The back of the primary keyboard includes a connection means (not shown) compatible with connection means 12. Conventional circuitry (including conventional cable and connection means) can be used for this purpose. This invention disclosure does not focus on specific circuitry because, as stated in the Summary, the essence of this invention does not relate thereto and persons of ordinary skill in the relevant art possess sufficient knowledge of keyboard circuitry to practice this invention. In this embodiment the auxiliary keyboard 1, the primary keyboard 20 and a computer (not shown) in conjunction with which the keyboards are used, are connected in daisy-chain fashion, i.e. character set data is transferred from the primary keyboard 20 to the auxiliary keyboard 1 through the connecting circuitry and from the auxiliary keyboard 1 to the computer (or other destination) through other circuitry means not shown. The invention is not limited to this daisy-chain arrangement. For example, character set data can be transferred in a parallel manner to the computer (or other destination) directly from each keyboard.

Figure 4:
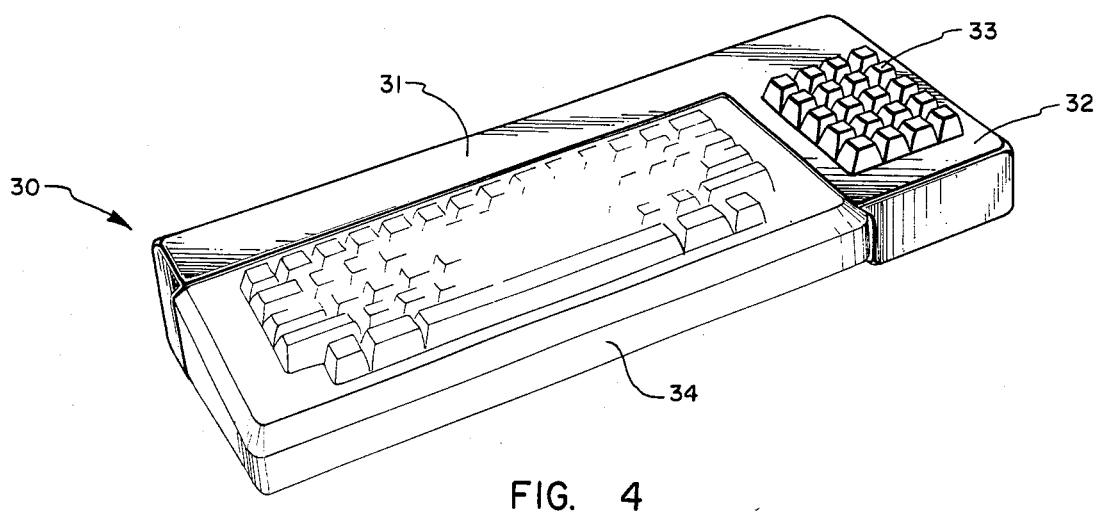
FIG. 4 depicts an alternative embodiment of the wrap-around auxiliary keyboard of this invention in combination with a primary keyboard.
Figure 5:
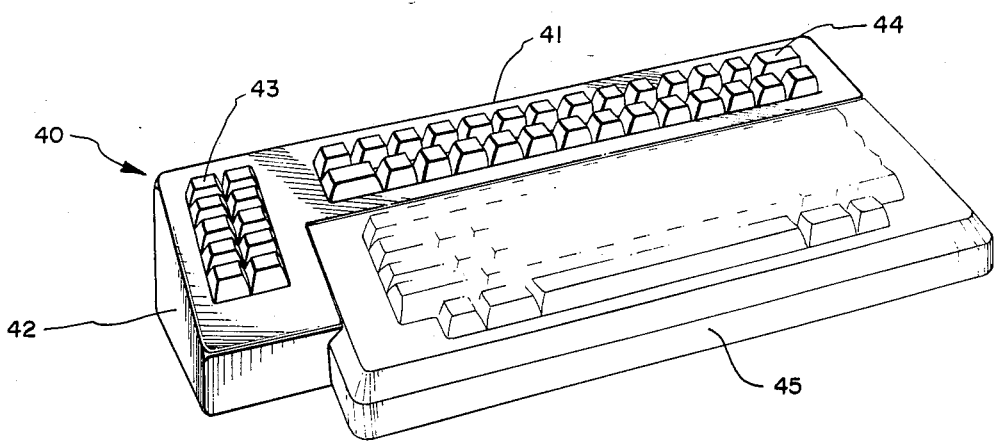
FIG. 5 depicts a second alternative embodiment of the wrap-around auxiliary keyboard of this invention in combination with a primary keyboard.
Figure 6:
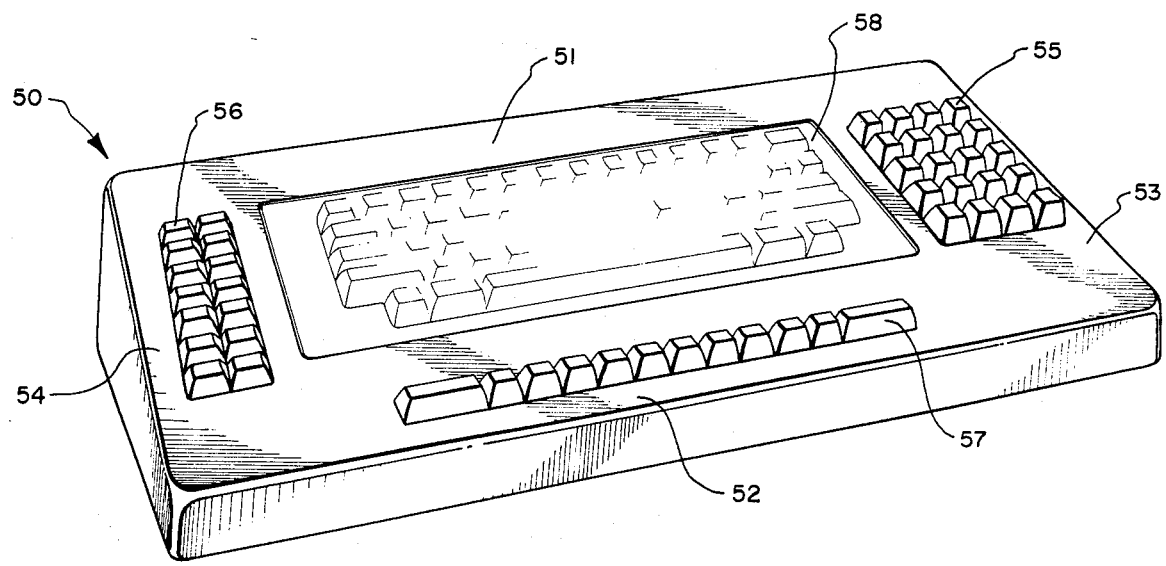
FIG. 6 depicts a third alternative embodiment of the wrap-around auxiliary keyboard of this invention in combination with a primary keyboard.

FIGS. 4, 5 and 6 depict other embodiments of this invention. FIG. 4 depicts an L-shaped auxiliary keyboard 30 having a base 31 and an extension 32 extending from base 31.

Extension 31 is substantially perpendicular to base 32. The housing formed by base 31 and extension 32 is shaped and adapted to accommodate keys 33 and circuitry for the input and transfer of character set data. The base 31 and extension 32 wrap-around the primary keyboard 34 in that base 31 interfaces with the back side of the primary keyboard 34 and extension 32 interfaces with the right side of the primary keyboard 34. As used in this disclosure and the appended claims an auxiliary keyboard (and its housing) is substantially L-shaped when the base-primary keyboard and extension-primary keyboard interfaces substantially and collectively assume the shape of an L.

FIG. 5 depicts an L-shaped auxiliary keyboard 40 having a base 41 and an extension 42. The housing formed by base 41 and extension 42 accommodates keys 43 and 44 and wraps-around primary keyboard 45. Extension 42 interfaces with more than half of the length of the left side of the primary keyboard 45. It is preferred that extensions (and bases) interface with at least half of the length of the primary keyboard side interfaced by them.

FIG. 6 depicts an O-shaped auxiliary keyboard 50 having two bases 51 and 52 and two extensions 53 and 54. This embodiment illustrated that the wrap-around auxiliary keyboard of this invention is not limited to a single base. The housing formed by bases 51 and 52 and extensions 53 and 54 is shaped and adapted to accommodate keys 55, 56 and 57. The housing wraps-around the entire primary keyboard 58. As used in this disclosure and the appended claims an auxiliary keyboard (and its housing) is O-shaped when the base-primary keyboard and extension-primary keyboard interfaces substantially and collectively assume the shape of a circle, an ellipse or a rectangle.

We claim:

1. A wrap-around auxiliary keyboard comprising:
   (a) housing;
   (b) keys positioned in said housing; and
   (c) circuitry means in said housing for input of character set data from said keys and for output of said character set data from said auxiliary keyboard;
   wherein said housing comprises a base and an extension extending from said base; and wherein said base and said extension are shaped and are positioned with respect to each other so as to be able to wrap-around a primary keyboard.

2. A wrap-around auxiliary keyboard in accordance with claim 1 further comprising:
   (d) a restraining means for restraining vertical movement of said primary keyboard relative to said housing.

3. A wrap-around auxiliary keyboard in accordance with claim 2 wherein said restraining means includes a lip extending from said housing.

4. A wrap-around auxiliary keyboard in accordance with claim 3 wherein said lip extending from said housing is positioned above the area to be occupied by said primary keyboard.

5. A wrap-around auxiliary keyboard in accordance with claim 1 wherein said primary keyboard is substantially rectangular.

6. A wrap-around auxiliary keyboard in accordance with claim 5 wherein said extension is substantially perpendicular to said base.

7. A wrap-around auxiliary keyboard in accordance with claim 1 further comprising:
   (d) circuitry means for the transfer of character set data between said auxiliary keyboard and said primary keyboard.

8. A wrap-around auxiliary keyboard in accordance with claim 1 wherein said housing further comprises a second extension extending from said base; wherein said base and said second extension are shaped and are positioned with respect to each other so as to be able to wrap-around said primary keyboard; and wherein said second extension is positioned to interface the side of said primary keyboard that is opposite the side of said primary keyboard interfaced by said first extension.

9. A wrap-around auxiliary keyboard in accordance with claim 8 wherein said second extension is substantially parallel to said first extension.

10. A wrap-around auxiliary keyboard in accordance with claim 1 further comprising:
    (d) a restraining means for restraining vertical movement of said primary keyboard;
    wherein said primary keyboard is substantially rectangular; and wherein said extension is substantially perpendicular to said base.

11. A wrap-around auxiliary keyboard in accordance with claim 10 wherein said housing further comprises a second extension extending from said base; wherein said base and said second extension are shaped and are positioned with respect to each other so as to be able to wrap-around said primary keyboard; wherein said second extension is positioned to interface with the side of said primary keyboard that is opposite the side of said primary keyboard interfaced by said first extension; wherein said restraining means includes a lip extending from said housing; and wherein said housing is a single unitary body.

12. A wrap-around auxiliary keyboard housing comprising:
    (a) a base; and
    (b) an extension extending from said base; wherein said base and said extension form a substantially L-shaped housing; and wherein said housing is shaped and adapted to accommodate keys and circuitry for the input and transfer of character set data.

13. A wrap-around auxiliary keyboard housing in accordance with claim 12 further comprising:
    (c) a second extension extending from said base; wherein said base, said first extension and said second extension form a substantially U-shaped housing.

14. A wrap-around auxiliary keyboard housing in accordance with claim 13 further comprising:
    (d) a restraining means for restraining the vertical movement of a primary keyboard positioned between said first extension and said second extension.

15. A wrap-around auxiliary keyboard housing in accordance with claim 14 wherein said restraining means includes a lip extending from at least one member of the group consisting of said base, said first extension and said second extension.

16. A wrap-around auxiliary keyboard housing comprising:
    (a) a substantially rectangular base;
    (b) a substantially rectangular first extension;
    (c) a substantially rectangular second extension; and
    (d) a restraining means;
    wherein said first extension is substantially perpendicular to said base; wherein said second extension is substantially perpendicular to said base; wherein said base, said first extension and said second extension form a substantially U-shaped housing; wherein said housing is shaped and adapted to accommodate keys and circuitry for the input and transfer of character set data; wherein said restraining means is for restraining the vertical movement of a primary keyboard relative to said housing; wherein said restraining means includes a lip extending from said base, said first extension and said second extension to restrain said primary keyboard against upward movement relative to said housing; and wherein said restraining means further includes means for restraining said primary keyboard against downward movement relative to said housing.

17. A keyboard system comprising: a substantially rectangular primary keyboard and a substantially L-shaped wrap-around auxiliary keyboard; wherein said primary keyboard and said auxiliary keyboard are in close physical proximity to each other; and wherein said auxiliary keyboard is positioned to wrap-around said primary keyboard.

18. A keyboard system in accordance with claim 17 wherein said auxiliary keyboard includes a means for restraining said primary keyboard against vertical movement, in at least one direction, relative to said auxiliary keyboard.

19. A keyboard system comprising: a substantially rectangular primary keyboard and a substantially U-shaped wrap-around auxiliary keyboard; wherein said primary keyboard and said auxiliary keyboard are in close physical proximity with each other; and wherein said auxiliary keyboard is positioned to wrap-around said primary keyboard.

20. A keyboard system in accordance with claim 19 wherein said auxiliary keyboard includes a means for restraining said primary keyboard against vertical movement, in at least one direction, relative to said auxiliary keyboard.

21. A keyboard system comprising: a substantially rectangular primary keyboard and an O-shaped wrap-around auxiliary keyboard; wherein said primary keyboard and said auxiliary keyboard are in close physical proximity to each other; and wherein said auxiliary keyboard is positioned to wrap-around said primary keyboard.

* * * * *